Sept. 29, 1964     A. HALPERT     3,151,069
AQUARIUM DEVICE
Filed May 10, 1961
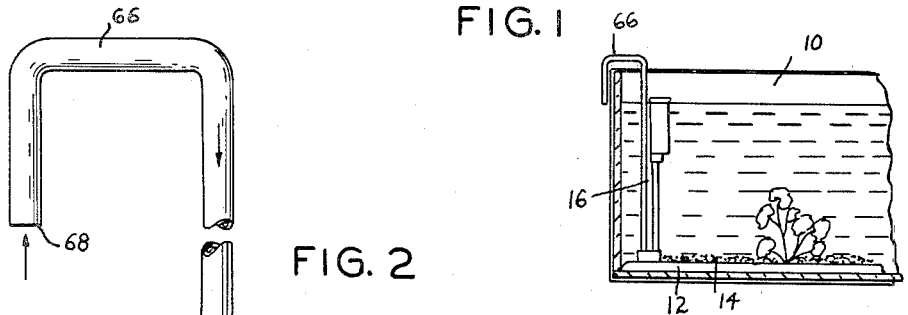
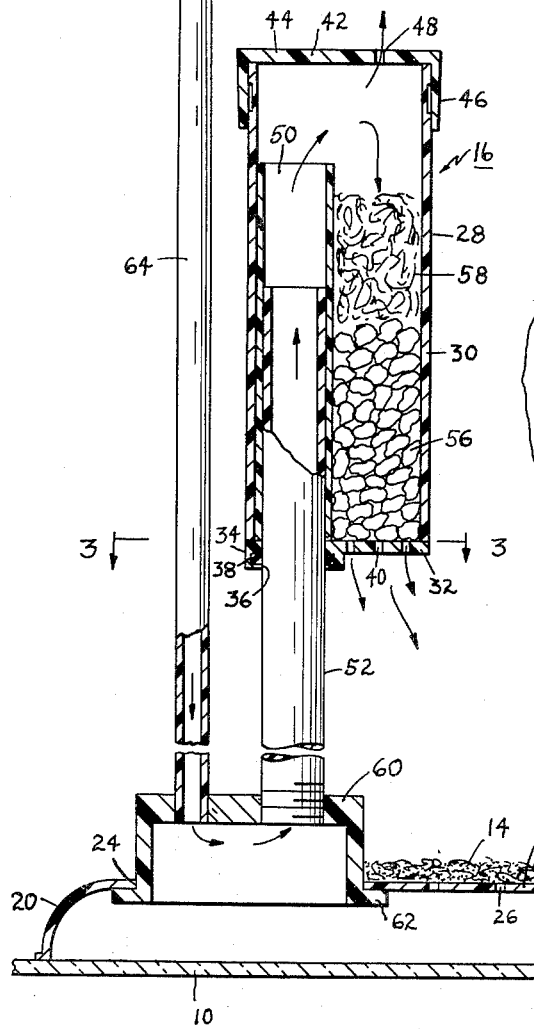
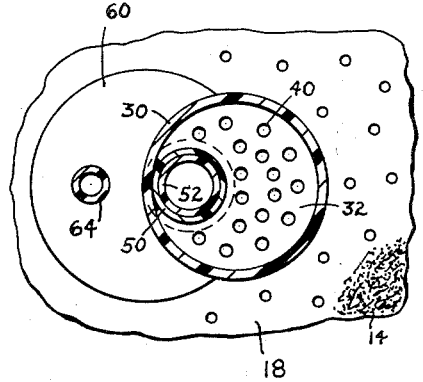
INVENTOR.
ABBY HALPERT
BY Arthur H. Seidel
ATTORNEY

United States Patent Office 3,151,069
Patented Sept. 29, 1964

3,151,069
AQUARIUM DEVICE
Abby Halpert, Brooklyn, N.Y., assignor to Halvin Products Co., Inc., Brooklyn, N.Y., a corporation of New York
Filed May 10, 1961, Ser. No. 109,167
3 Claims. (Cl. 210—169)

This invention relates to an aquarium device, and more particularly, to a filtering device for filtering the water in an aquarium.

The aquariums that are normally used for cultivating fish in the home are relatively small. The water in such aquariums is practically stationary and is seldom replaced. The water of such an aquarium becomes contaminated with excretion from the fish and other foreign matter which fall into the aquarium. Accordingly, cleaning of the water is necessary.

In order to provide a practical filtering device, it is necessary for the filter medium to be disposed in a manner which permits facile removal for cleaning purposes and substitution of replacement filter cartridges. An improved aquarium device is shown in my copending application Serial No. 822,984 filed June 19, 1959, now U.S. Patent No. 3,006,476, for Aquarium Filter, of which this application is a continuation-in-part.

It is an object of this invention to provide a novel aquarium filtering device.

It is another object of this invention to provide an aquarium filter which can be easily removed from the aquarium to replace the filter medium.

It is another object of this invention to provide a novel aquarium filter which can be used as an auxiliary to an under gravel filter to extend the lift of the filter medium in the under gravel filter.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a sectional view through an aquarium containing the filter of the present invention.

FIGURE 2 is an elevational view partly in section of the aquarium filter of the present invention.

FIGURE 3 is a transverse sectional view taken along the lines 3—3 in FIGURE 2.

Referring to the drawing in detail, wherein like numerals indicate like elements, there is shown in FIGURE 1 an aquarium which includes a tank 10, an under gravel filter 12 which is seated on the bottom of the tank 10, gravel 14 covering the under gravel filter 12, and the filtering device of the present invention which is generally designated as 16.

The under gravel filter 12 in general comprises a plate 18. The plate 18 is of a size sufficient to extend across the bottom of the tank 10. The rim 20 spaces the plate 18 slightly from the bottom of the tank 10. The plate 18 has a relatively large hole 24 therethrough adjacent one end and a plurality of small holes 26 through which water can pass.

As shown more clearly in FIGURE 2, the filtering device 16 of the present invention comprises a housing 28 having an elongated cylindrical outer wall 30 and a bottom wall 32. The walls 30 and 32 are made from a transparent plastic material. The periphery of the wall 32 corresponds with the periphery of the wall 30. The wall 32 is fixedly secured to one end of the wall 30 in any convenient manner.

The wall 32 is provided with a hub 34 which is tangent to the periphery thereof. The hub 34 is provided with a hole 36 extending therethrough. The hub 34 is provided with a recess coextensive with the hole 36. A gasket seal 38 is disposed within said recess.

As shown more clearly in FIGURE 3, the end wall 32 is provided with a plurality of small holes 40 extending therethrough. A removable cap 42 made from polyethylene material is disposed on the end of the cylindrical wall 30 remote from the bottom wall 32.

The cap 42 comprises a cover portion 44 and an annular rim 46 which fits tightly around the wall 30. The cover portion 44 is provided with a single hole 48. The hole 48 is offset with respect to the longitudinal axis of the cylindrical wall 30.

The divider tube 50 is disposed within the housing 28. The inner peripheral surface of the divider tube 50 corresponds with the diameter of the hole 36. The bottom end of the divider tube 50 is adhesively secured to the inner surface of the bottom wall 32 with the divider tube 50 being coaxial with respect to the hole 36. The outer peripheral surface of the divider tube 50 is adhesively secured to the inner peripheral surface of the cylindrical wall 30.

The divider tube 50 extends upwardly from the bottom wall 32 to a point slightly below the cap 42. An output tube 52 extends through the hole 36 to a point below the uppermost edge of the divider tube 50. The output tube is frictionally engaged with the gasket seal 38 and the inner peripheral surface of the output tube 52.

The housing 28 is partially filled with charcoal 56 and glass wool 58. Although the glass wool 58 is shown to be above the charcoal 56, the glass wool 58 can be in the bottom of the housing 28 beneath the charcoal 56.

The lowermost end of the output tube 52 is threadedly engaged with an end wall on a cup-shaped member 60. The cup-shaped member 60 is annular in transverse cross section and is provided with a peripheral lip 62. The outer peripheral surface of the cup-shaped member 60 extends through the hole 24 in the plate 18 with a press fit. An air inlet tube 64 extends through an end wall on the cup-shaped member 60 and is secured thereto by means fo a press fit.

The filter device 16 of the present invention is adapted to be disposed with the cap 42 above liquid level in the tank 10 as shown more clearly in FIGURE 1. The air inlet tube 64 is provided with a bright portion 66 which is adapted to extend over the side wall of the tank 10. The end 68 of the air inlet tube 64 is adapted to be connected to a source of air such as an air pump.

In use of the present invention, air entering the air inlet tube 64 follows the flow pattern of arrows shown in FIGURE 2. As the air flows upwardly through the output tube 52, it displaces water upwardly through the output tube 52 into the housing 28. Additional water is caused to flow through the gravel 14 into the space below the plate 18.

Air which goes up the output tube 52 to the housing 28 escapes through the vent hole 48 to atmosphere without contaminating the water in the aquarium. The water passes down through the glass wool 58 and charcoal 56, which remove waste gases and solids therefrom. Thereafter, the filtered water re-enters the tank 10 by exiting from the housing 28 through the holes 40.

The filtering action of the glass wool 58 and the charcoal 56 is auxiliary to the filtering action of the gravel 14. When the charcoal and/or the glass wool 58 become contaminated, it is only necessary to lift the housing 28 from the end of the output tube 52 and remove the same from the tank 10. Then the cap 42 is removed from the housing 28 so that fresh charcoal and glass wool may be substituted for the contaminated charcoal and glass wool. Then the cap 42 is replaced on the housing 28 and the housing 28 is immersed in the water of the tank 10 so that it is mounted on the output tube 54. Thus, the filter medium of the housing 28 may be easily and quickly replaced without disturbing the arrangement of the other elements in the aquarium tank 10.

The location of the divider tube 50 adjacent to the inner peripheral surface of the cylindrical wall 30 provides for facile replacement of the charcoal 56 and glass wool 58. In addition, the location of the divider tube 50 enables the same to be adhesively secured to the inner peripheral surface of the wall 30 thereby assuring a rigid construction which will perform satisfactorily. The vent hole 48 in the cap 42 is offset from the longitudinal axis of the divider tube 50 so that the water cannot escape therethrough. The size of the vent hole 48 is substantially smaller than the size of the air inlet tube 64. Accordingly, air will form a pocket within the upper portion of the housing 28 thereby assisting in expelling the water through the glass wool 58 and the charcoal 56 and then through the holes 40 in the bottom wall 32.

The manner in which the water in the aquarium will be caused to circulate by the flow of air is well known to those skilled in the art and need not be described in detail. A recirculation system of this nature may be found in Patent 1,574,783.

The present invention may be embodied in other specific forms without departing from the spirit or essential attributes thereof and, accordingly, reference should be made to the appended claims, rather than to the foregoing specification as indicating the scope of the invention.

I claim:
1. An aquarium filter comprising a cylindrical housing having a bottom wall secured thereto, a divider tube fixedly secured to said bottom wall with the inner peripheral surface of said divider tube being substantially coextensive with an aperture in said bottom wall, an output tube extending through said aperture into said divider tube, said output tube and divider tube having a friction fit therebetween for relative axial movement between said tubes, the upper end of said output tube being lower than the upper end of said divider tube, a cap closing the upper end of said housing, the upper end of said divider tube being spaced below a cap on said housing, a vent hole in said cap for allowing air to escape from within said housing, the position of said vent hole being offset with respect to the longitudinal axis of said housing, filter material disposed within said housing between the outer peripheral surface of said divider tube and the inner peripheral surface of said housing, a plurality of holes in said bottom wall, the lower end of said output tube being fixedly secured to a cup-shaped member, an air inlet tube secured to said cup-shaped member, and means for supporting said cup-shaped member spaced from a bottom wall of an aquarium tank.

2. An aquarium filter in accordance with claim 1 wherein said means includes a gravel filter plate, said cup-shaped member being secured to said gravel filter plate, said gravel filter plate having a planar portion, said planar portion having a plurality of holes therethrough, said gravel filter plate having a second portion which is disposed out of the plane of said planar portion.

3. A filter in accordance with claim 1 wherein a portion of the outer peripheral surface of said divider tube is adhesively secured to the inner peripheral surface of said housing.

References Cited in the file of this patent
UNITED STATES PATENTS

| | | |
|---|---|---|
| 2,748,075 | Hovlid | May 29, 1956 |
| 2,820,548 | Marcus et al. | Jan. 21, 1958 |
| 2,877,898 | Lacey | Mar. 17, 1959 |
| 3,006,476 | Halpert | Oct. 31, 1961 |

FOREIGN PATENTS

| | | |
|---|---|---|
| 663,562 | Great Britain | Dec. 27, 1951 |